United States Patent
Tsai (10) Patent No.: US 7,939,773 B2
(45) Date of Patent: May 10, 2011

(54) ILLUMINATED KEYBOARD WITH A LIGHT GUIDE PLATE

(75) Inventor: Huo-Lu Tsai, Taichung Hsien (TW)

(73) Assignee: Tingo Mold Electronics Technology (Shen Zhen) Co., Ltd., Shenzhen (CN)

( * ) Notice: Subject to any disclaimer, the term of this patent is extended or adjusted under 35 U.S.C. 154(b) by 272 days.

(21) Appl. No.: 12/266,836

(22) Filed: Nov. 7, 2008

(65) Prior Publication Data

US 2009/0256726 A1 Oct. 15, 2009

(30) Foreign Application Priority Data

Apr. 11, 2008 (CN) .......................... 2008 1 0066580

(51) Int. Cl.
*H01H 13/83* (2006.01)
(52) U.S. Cl. ......................... 200/313; 200/314; 200/317
(58) Field of Classification Search .......... 200/310–317; 362/24, 26, 30, 85, 31, 577
See application file for complete search history.

(56) References Cited

U.S. PATENT DOCUMENTS

| | | | | |
|---|---|---|---|---|
| 6,670,565 B2* | 12/2003 | Hanahara et al. | ............. | 200/314 |
| 6,860,612 B2* | 3/2005 | Chiang et al. | ................... | 362/29 |
| 6,991,359 B2* | 1/2006 | Leu et al. | ...................... | 362/624 |
| 7,057,125 B1* | 6/2006 | Tsai | ............... | 200/310 |
| 7,388,167 B2* | 6/2008 | Liao et al. | ..................... | 200/310 |
| 7,423,229 B2* | 9/2008 | Chen | .............................. | 200/314 |
| 7,432,464 B2* | 10/2008 | Chiu et al. | .................... | 200/310 |
| 7,455,416 B2* | 11/2008 | Chen | ............................... | 362/85 |
| 7,534,001 B2* | 5/2009 | Liu | .................................. | 362/24 |
| 7,543,971 B2* | 6/2009 | Lee et al. | ...................... | 362/616 |
| 7,736,042 B2* | 6/2010 | Park et al. | ..................... | 362/602 |
| 2005/0128188 A1* | 6/2005 | Chien et al. | ................... | 345/168 |

* cited by examiner

*Primary Examiner* — Michael A Friedhofer
(74) *Attorney, Agent, or Firm* — Weiner & Burt, P.C.; Irving M. Weiner; Pamela S. Burt (57) ABSTRACT

An illuminated keyboard with a light guide plate of the present invention includes a key module and a luminous module located under the key module. The luminous module includes a transparent light guide plate, a plurality of illuminants, and a light reflection plate located under the light guide plate. The light guide plate is provided with a plurality of light input units which are sections formed at the light guide plate. The illuminants are located corresponding to the light input units, and the light emitted by the illuminants is transmitted into the light guide plate via the sections. The light guide plate is provided with a plurality of light output units to provide the light to the key module. Each light output unit is provided with a plurality of light output members. The quantity of the light output members of each light output unit located at the same side of the illuminants increases with the increasing distance between the light output units and the illuminants. The light emitted from the illuminants to the light input units of the light guide plate, transmitted through the light guide plate and refracted or scattered at the light output units. The quantity and structure of the light output members of each light output unit and the position of the light output units can be adjusted according to the requirements, thereby providing even and bright light to the key module.

6 Claims, 9 Drawing Sheets

ILLUMINATED KEYBOARD WITH A LIGHT GUIDE PLATE

FIELD OF THE INVENTION

The present invention relates to a keyboard, particularly to an illuminated keyboard with a light guide plate.

BACKGROUND OF THE INVENTION

Keyboards are used very widely as a kind of input device. Generally keyboards are used in a circumference with sufficient light. So, most keyboards themselves have no luminous function. However, sometimes keyboards may need to be used in the situations with insufficient light or without light, and so some keyboards are provided with LEDs. Therefore, an illuminated keyboard with a light guide plate is produced.

The conventional illuminated keyboard with a light guide plate employs LED as an illuminant. Light is guided to the inferior of the key module of the keyboard via the light guide plate. The key module is made with the function of light transmission, so as to implement the luminous function of the keyboard. Therefore, in a circumference with weak or dark light, the marks on the keys of the keyboard can be shown clearly by the light emitted from the light guide plate, thereby facilitating to operate.

However, the structure of the illuminated keyboard to transmit the light from the LED to the light guide plate and then to the key module is complicated, which adversely affects to reduce the cost.

SUMMARY OF THE INVENTION

An object of the present invention is to provide an illuminated keyboard with a light guide plate which has a plurality of light input units and light output units, each light output unit having a plurality of light output members, wherein the quantity and structure of the light output members and the position of the light output units can all be adjusted according to requirement to improve the luminous effect, and the structure of the light guide plate is simple thereby effectively saving energy and reducing cost.

To achieve the above mentioned object, an illuminated keyboard with a light guide plate of the present invention includes a key module and a luminous module located under the key module. The luminous module includes a transparent light guide plate, a plurality of illuminants, and a light reflection plate located under the light guide plate. The light guide plate includes a plurality of light input units and light output units. The light input units are sections formed at the light guide plate. Each light output unit is provided with a plurality of light output members to provide light to the key module. The illuminants are located corresponding to the light input units The light emitted by the illuminants is transmitted into the light guide plate via the sections. The light output units located at the same side of the illuminants each has increasing quantity of light output members with the increasing distance between the light output units and the illuminants.

Wherein the illuminants are LEDs emitting light with unilateral side and located at the light reflection plate; the light reflection plate is provided with a plurality of receiving holes respectively receiving the illuminants therein, a circuit board is disposed at the bottom surface of the light reflection plate corresponding to the receiving holes, the circuit board is electrically connected with the illuminants and is connected to a power supply via a power wire; a plurality of through holes is defined in the light guide plate thereby forming the sidewall of the through hole to be the light input units; and the through holes located corresponding to the receiving holes respectively receive the illuminants therein.

Wherein each light output member is a through aperture, a convex point, a concave point, or a recess, and each light output unit correspondingly has a plurality of through apertures, convex points, concave points, or recesses.

Wherein each light output member is a round through aperture, and the outermost light output units far away from the illuminants are further provided with elongate through slots respectively.

Wherein each light output unit has at least two kinds of light output members which are selected from through aperture, convex point, concave point, and recess.

Wherein each light output unit has one kind of light output members which are selected from through aperture, convex point, concave point, and recess.

Wherein the light output units are arranged in a plurality of rows, and the light output units at the same side of the illuminants are interlaced with each other.

Wherein the key module is provided with a plurality of rows of keys; the light guide plate is provided with a light input area, a light output area, and a connection area connected between the light input area and the light output area; the light input units are located at the light input area, the light output units are located at the light output area; and the connection area is located corresponding to at least one row of keys.

An illuminated keyboard with a light guide plate of the present invention includes a key module having a plurality of rows of keys, and a luminous module located under the key module. The luminous module includes a transparent light guide plate, a plurality of illuminants and a light reflection plate located under the light guide plate. The light guide plate has a light input area, a light output area, and a connection area connected between the light input area and the light output area. The light input area is provided with a plurality of light input units which are sections formed at the light guide plate. The light output area is provided with a plurality of light output units to provide the light to the key module. The connection area is located corresponding to at least one row of keys. The illuminants are located corresponding to the light input units. The light emitted by the illuminants is transmitted into the light guide plate via the sections.

An illuminated keyboard with a light guide plate of the present invention includes a key module and a luminous module located under the key module. The luminous module includes a transparent light guide plate, a plurality of illuminants and a light reflection plate located under the light guide plate. The light guide plate has a plurality of light input units which are sections formed at the light guide plate, and a plurality of light output units to provide the light to the key module. Each light output unit has a plurality of light output members which have at least two kinds of structure selected from through aperture, convex point, concave point, and recess. The illuminants are located corresponding to the light input units. The light emitted by the illuminants is transmitted into the light guide plate via the sections.

The illuminated keyboard of the present invention has the following advantages. Firstly, the illuminated keyboard with a light guide plate of the present invention has the illuminants located at the light reflection plate to emit light to the light input units of the light guide plate. Then the light is transmitted through the light guide plate, and reflected or scattered at the light output units thereby having the effects of concentrating the light and evenly scattering the light. At the same time, the light emitted to the light reflection plate is reflected to the light output units by the light reflection plate thereby enhancing the intensity of the light emitted to the light output units.

Secondly, the quantity and position of the light output members of each light output unit corresponding to different keys can be adjusted according to the requirements. Different light output units can have different configuration. The light output members can also be configured to be different structure according to the requirements. Therefore, the configuration of the light output members can be optimized whereby the luminous module can provide even and bright light to the key module.

Thirdly, the light source of the illuminated keyboard with a light guide plate of the present invention is provided by the way of providing the illuminants locally and then evenly emitting the light to each key via the light output units, instead of the way of providing illuminants under each key, thereby effectively saving energy.

In summary, the illuminated keyboard of the present invention has the function of providing even and bright light to the key module through the light guide plate with light output units, thereby providing ornaments or identifying the position of the keys. Furthermore, the illuminated keyboard of the present invention has a simple structure, can effectively save energy and reduce the production cost.

The technical solution and the beneficial effects of the present invention are best understood from the following detailed description with reference to the accompanying figures and embodiments.

DESCRIPTION OF THE PREFERRED EMBODIMENTS

Figure 1:
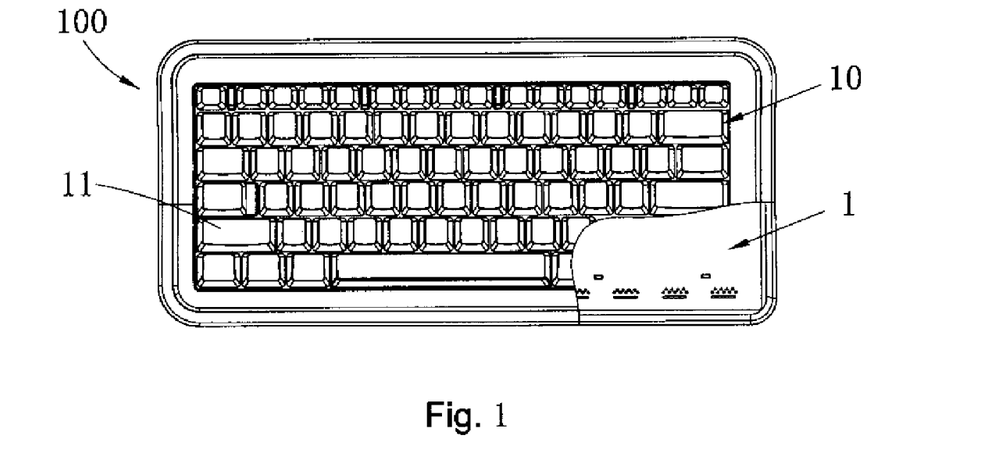
FIG. 1 is a perspective view of an illuminated keyboard with a light guide plate in accordance with a first embodiment of the present invention with a portion cut out.
Figure 2:
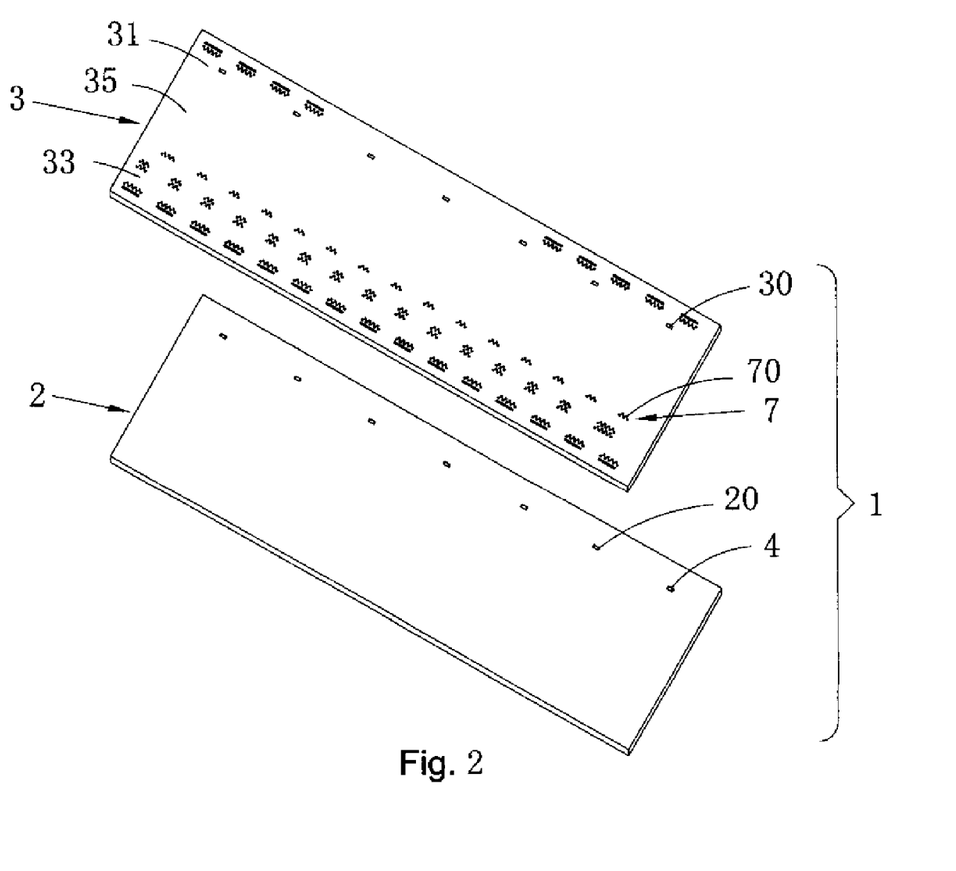
FIG. 2 is an exploded view of a luminous module in FIG. 1.
Figure 3:
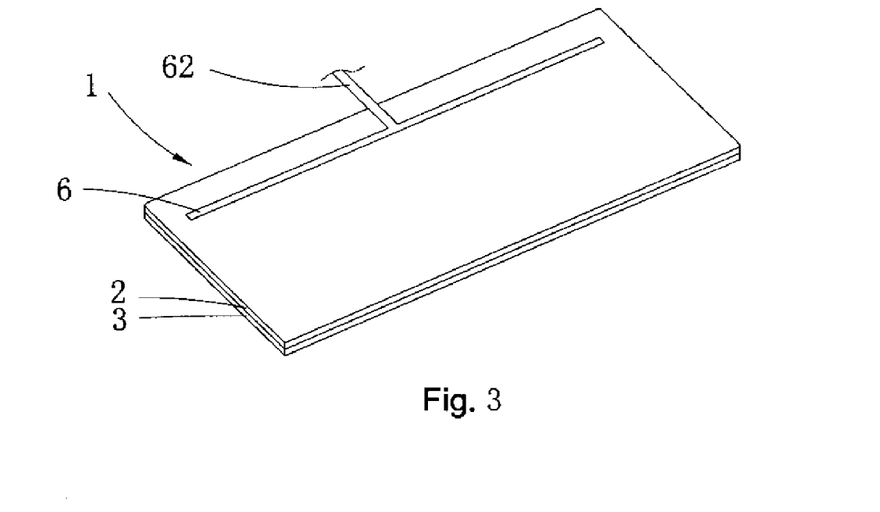
FIG. 3 is an assembly of FIG. 2 viewed from another angle.

Referring to FIG. 1 and FIG. 2, an illuminated keyboard 100 with a light guide plate in accordance with a first embodiment of the present invention comprises a key module 10 and a luminous module 1. The key module 10 comprises a plurality of rows of keys 11 which can be wholly or partially made of transparent or semitransparent materials to transmit the light emitted from the luminous module 1. It should be noticed that, an actual keyboard is also provided with other components such as an upper case, a thin film circuit board, and so on. Since the other components are similar to those used in the conventional keyboards, they will not be described detailedly herein.

The luminous module 1 located under the key module 10, comprises a light guide plate 3, a plurality of illuminants 4 and a light reflection plate 2 located under the light guide plate 3. The light guide plate 3 is a transparent thin film, such as a PC thin film. The light guide plate 3 is provided with a light input area 31, a light output area 33, and a connection area 35 connected between the light input area 31 and the light output area 33. The connection area 35 is set to be smooth. The light input area 31 is provided with a plurality of light input units 30. The light input units 30 are sections (cross sections) formed at the light guide plate 3. The illuminants 4 are horizontally and evenly distributed corresponding to the light input units 30 and adjacent to the light reflection plate 2. Each illuminant 4 adopts LED emitting light unilaterally. The light emitted from the LED is transmitted through the sections into the light guide plate 3, and then uniformly diffuse along the light guide plate 3. The major improvements of the present invention are that, the light output area 33 is provided with a plurality of light output units 7 to provide light to the key module 10. The light output units 7 are arranged in a plurality of rows corresponding to a plurality of rows of keys 11 of the key module 10, thereby providing light to the key module 10. Each light output unit 7 comprises a plurality of light output members 70. The light emitted from the illuminants 4 to the light guide plate 3 is refracted or scattered at the light output units 7, and then transmitted to the key module 10, whereby the light output units 7 have the functions of concentrating light and evenly scattering light and so can make the luminous effect of the keys better.

When the light emitted by the illuminants 4 passes through the light output units 7 relatively close to the illuminants 4, a part of the light are sent out at these light output units 7. Thus, the light received by the light output units 7 relatively far from the illuminants 4 is weakened. To overcome this problem, the connection area 35 close to the light input area 31 is set to be smooth without the light output units 7 and corresponding to at least one row of keys 11. Furthermore, in the light output area 33, the quantity of the light output members 70 of each light output unit 7 located at the same side of the illuminants 4 increase along with the increasing of the distance between the light output units 7 and the illuminants 4. Generally speaking, the quantity of the light output members 70 of each light output unit 7 located at the same row corresponding to the keys 11 is approximately equal, and the light output units 7 located at different rows are interlaced with each other to evenly emit the light to different keys 11, thereby achieving even brightness of each key 11 of the illuminated keyboard 100 with the light guide plate.

Figure 4:
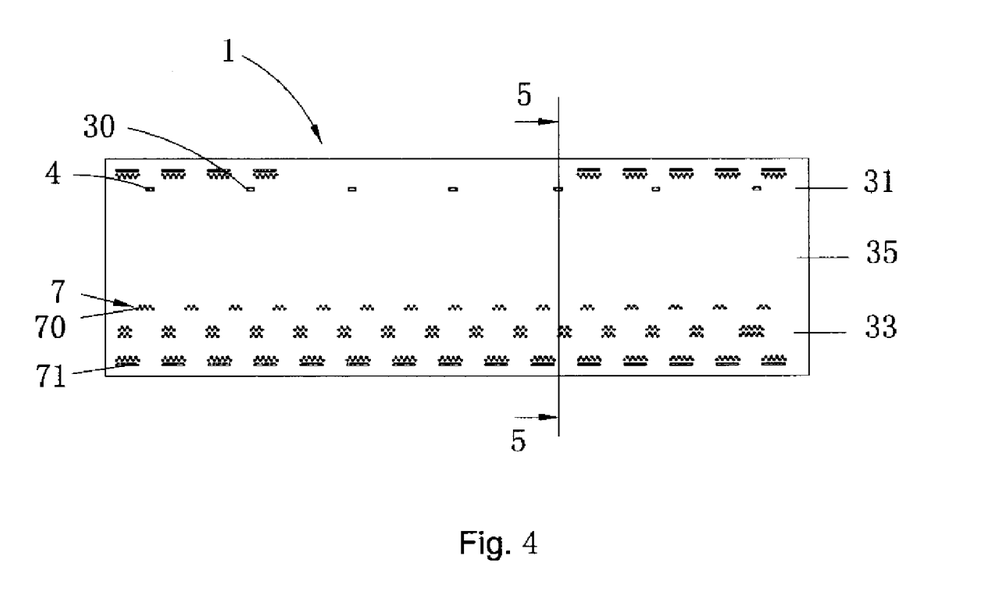
FIG. 4 is a front view of the assembly of FIG. 2.
Figure 5:
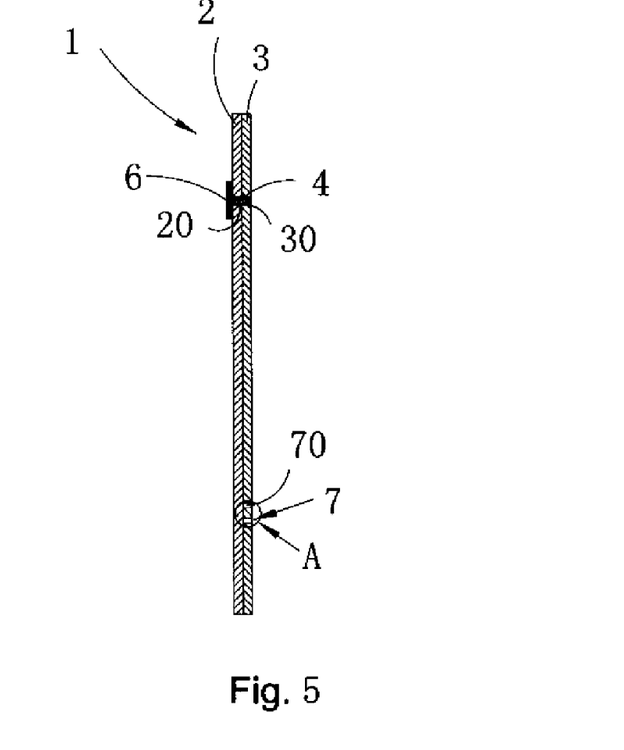
FIG. 5 is a cross-sectional view of FIG. 4 taken along line 5-5.
Figure 6:
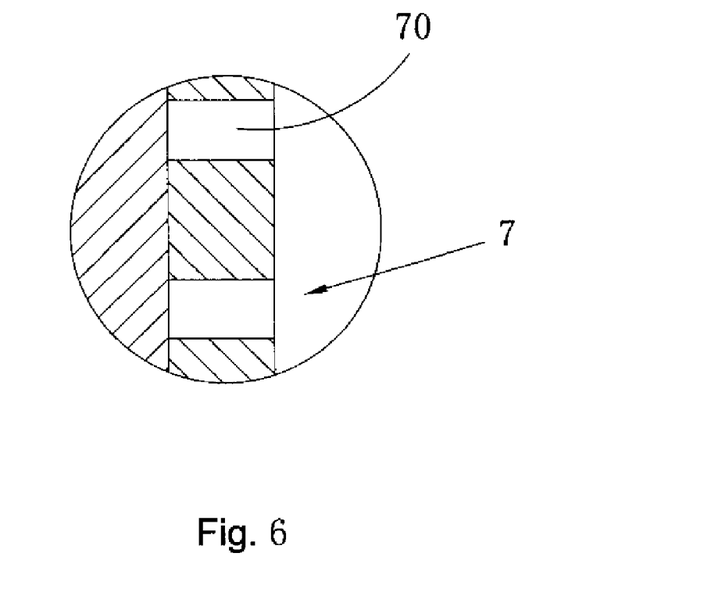
FIG. 6 is an enlarged view of circled portion A of FIG. 5.

Referring to FIGS. 3-6, in this embodiment, the light reflection plate 2 is provided with a plurality of receiving holes 20. The illuminants 4 are received in the receiving holes 20. The bottom surface of the light reflection plate 2 is provided with a circuit board 6 corresponding to the receiving holes 20. The circuit board 6 is electrically connected to the illuminants 4. The circuit board 6 can be connected to a power supply (not shown) via a power wire 62, or can be connected to the power supply circuit provided on the thin film circuit board (not shown). The light guide plate 3 is defined with a plurality of through holes 30 thereby forming the light input units 30 which are the sidewall of the through holes 30 (that is, the cross section of the light guide plate 3 formed by cutting the light guide plate 3 to define the through holes 30). The through holes are located corresponding to the receiving holes 20 and the illuminants 4 are received in the through holes 30. In this embodiment, the light output members 70 are through aperture, and each light output unit 7 includes a plurality of through apertures 70. It should be noticed that, in this embodiment, the through apertures are round. An elongate through slot 71 is defined in the light guide plate 3 at the outermost light output units 7 far away from the illuminants 4. The configuration of the through apertures and through slots is convenient and reasonable. In this embodiment, the light output units 7 corresponding to the same row of keys 11 have the same quantity of the through apertures. As shown in FIG. 4, the first row of light output units 7 of the light guide plate 3 each has five through apertures, and the second row of light output units 7 each has ten through apertures. Of course, the quantity of the light output members of each light output unit can also be different according to the actual requirements of key configuration. For example, the light output unit close the edge of the light guide plate 3, or corresponding to a key 11 with different size relative to other keys in the same row, has different quantity of through apertures. As shown in FIG. 4, the leftmost light output unit 7 of the first row has seven through apertures, and other light output units 7 in the same row each has five through apertures.

Figure 7:
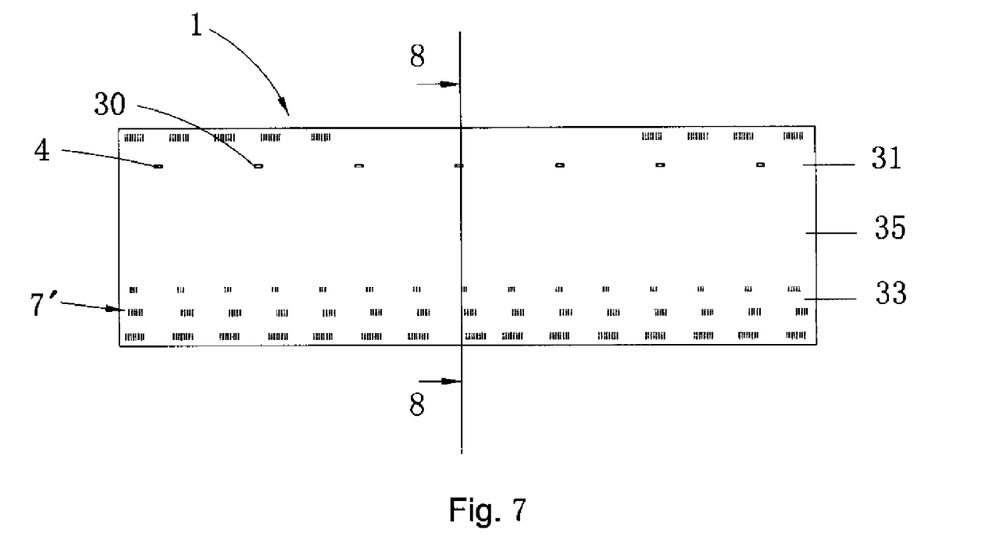
FIG. 7 is similar to FIG. 4 but showing a luminous module in accordance with a second embodiment of the present invention.
Figure 8:
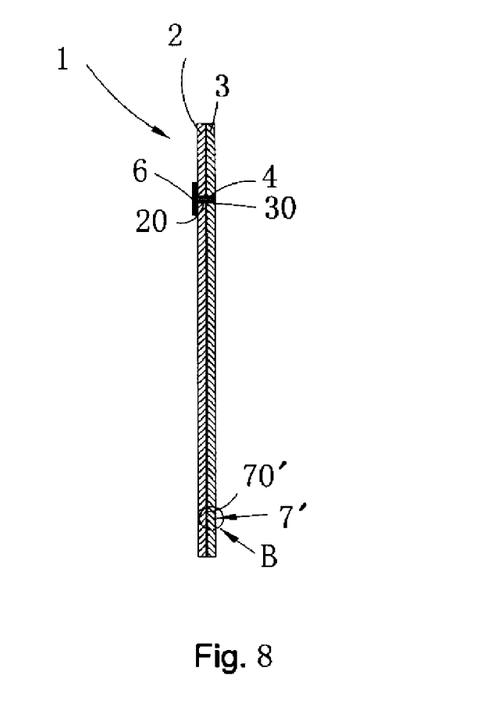
FIG. 8 is a cross-sectional view of FIG. 7 taken along line 8-8.
Figure 9:
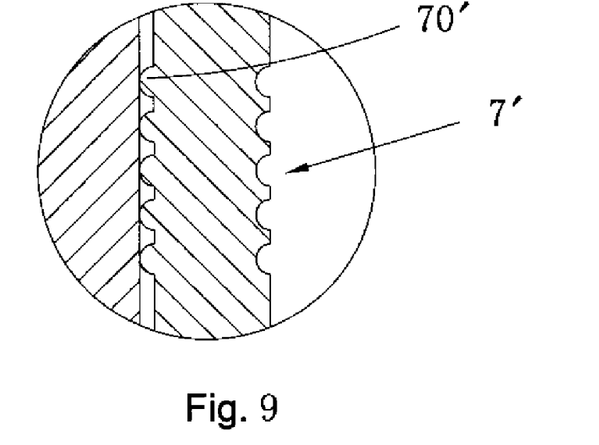
FIG. 9 is an enlarged view of circled portion B of FIG. 8.

Referring to FIGS. 7 to 9, a light guide plate 3 of a second embodiment in accordance with the present invention is similar to that of the first embodiment of the present invention, except that a plurality of light output members 70' each is a concave point relative to the front surface (that is, the surface facing the key module) of the light guide plate 3. Each light output unit 7' has a plurality of light output members 70' which are all concave points formed by pressing. In other words, the light output members 70' are protruded from the surface of the light guide plate 3 facing the light reflection plate 2, and recessed from the other surface of the light guide plate 3 facing the key module 10. The configuration principle of the concave points is similar to that of the abovementioned through apertures 70. The connection area 35 close to the illuminants 4 is provided without light output units 7'. The light output units 7' each has different amount of light output members 70' in accordance with the different distance between the light output units 7' and the illuminants 4. Each light output unit 7' more away from the illuminants 4 has more concave points 70'. The light output units 7' corresponding to the same row of keys 11 each has same quantity of the concave points. In addition, as an alternative embodiment, the light output 5 members 70' each can be a convex point Each light output unit 7' has a plurality of light output members 70' which all are convex points. That is, the light output members 70' are recessed from the surface of the light guide plate facing the light reflection plate 2, and protruded from the other surface of the light guide plate facing the key module 10.

Figure 10:
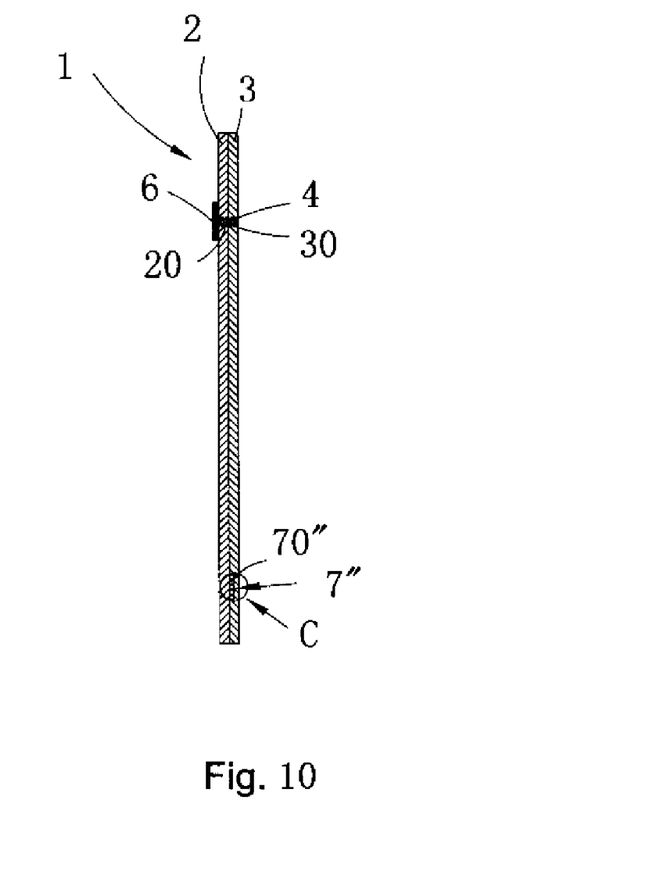
FIG. 10 is similar to FIG. 8 but showing a luminous module in accordance with a third embodiment of the present invention.
Figure 11:
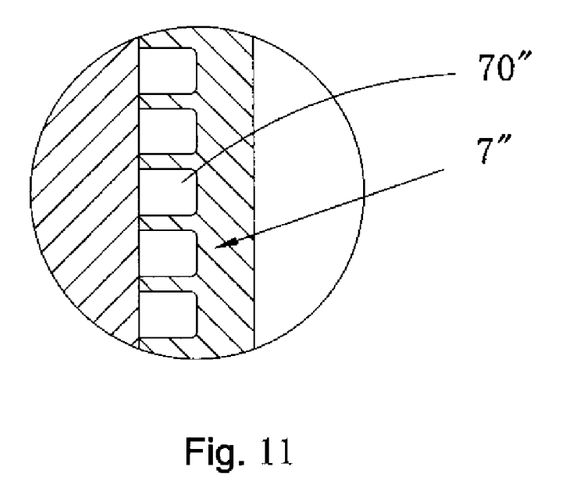
FIG. 11 is an enlarged view of circled portion C of FIG. 10.

Referring to FIG. 10 and FIG. 11, a light guide plate 3 of a third embodiment in accordance with the present invention is similar to that of the second embodiment of the present invention, except that a plurality of light output members 70" each is a recess. Each light output unit 7" has a plurality of light output members 70" which all are recesses. The recesses 70" can be located at the front surface of the light guide plate 3 (that is, the surface facing the key module 10), and also can be located at the back surface of the light guide plate (that is, the surface facing the light reflection plate 2). The surface of the light guide plate opposite to the recesses is set to be smooth. In addition, as an alternative embodiment, the light output units of the light guide plate 3 can also be of ornamental engraving structure or etching structure, or of pattern with rugged face, which can realize the effects of concentrating the light and evenly scattering the light.

Figure 12:
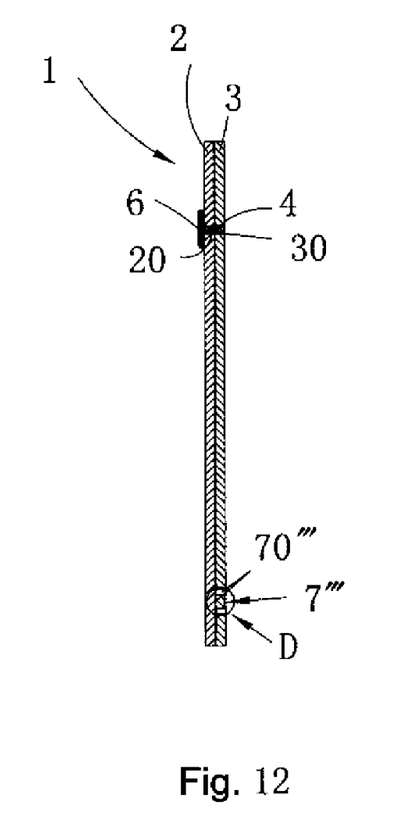
FIG. 12 is similar to FIG. 8 but showing a luminous module in accordance with a fourth embodiment of the present invention.
Figure 13:
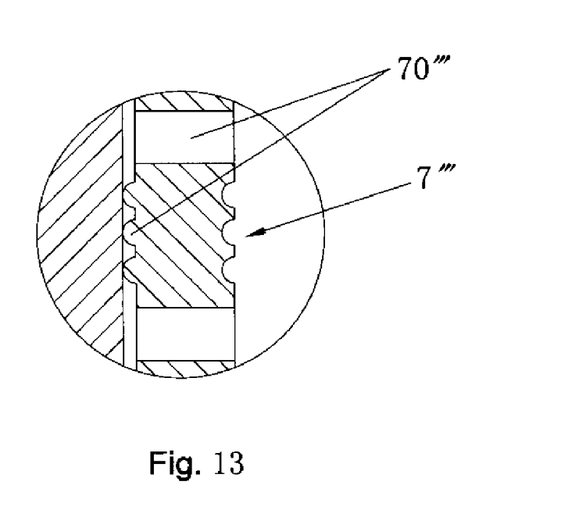
FIG. 13 is an enlarged view of circled portion D of FIG. 12.

Referring to FIG. 12 and FIG. 13, a light guide plate 3 of a fourth embodiment in accordance with the present invention is similar to that of the above embodiment of the present invention, except that each light output unit 7''' has a plurality of different light output members 70' which are separately adopted with at least two kinds of structure of through aperture, convex point, concave point and recess according to the requirements. This complex structure can better make use of the structure features of various light output members 70''', to make the refraction and scatter effects of the light output units 7''' better, thereby providing better luminous effect to the key module 10. As shown in the figure, each light output unit 7''' comprises a plurality of concave points and through apertures.

Figure 14:
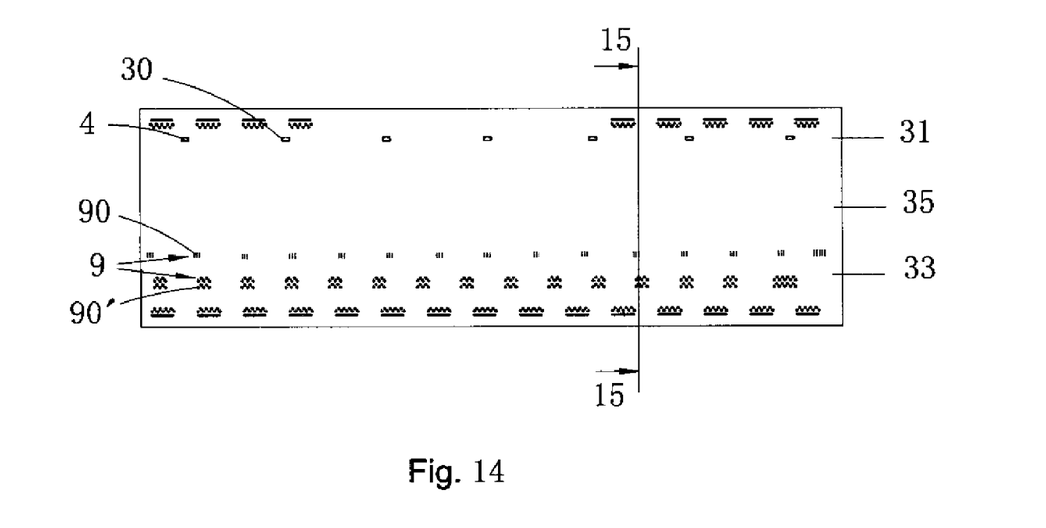
FIG. 14 is similar to FIG. 4 but showing a luminous module in accordance with a fifth embodiment of the present invention.
Figure 15:
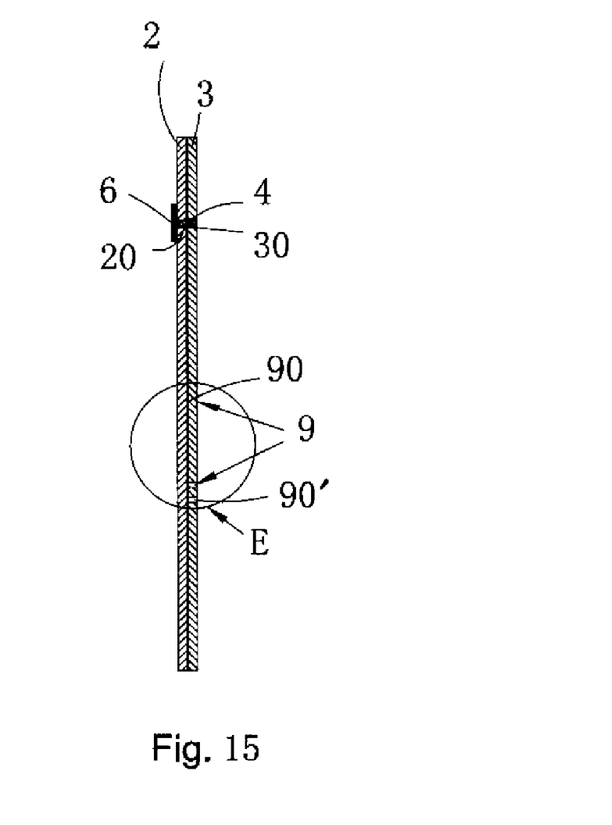
FIG. 15 is a cross-sectional view of FIG. 14 taken along line 15-15.
Figure 16:
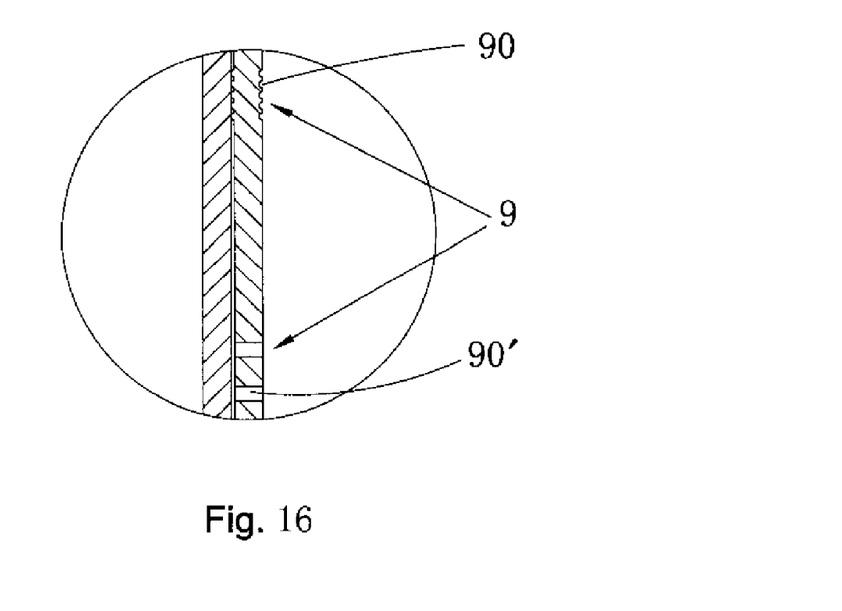
FIG. 16 is an enlarged view of circled part E of FIG. 15.

Referring to FIG. 14 to FIG. 16, a light guide plate 3 of a fifth embodiment in accordance with the present invention is similar to that of the above embodiment of the present invention, except that a plurality of light output members 90 is adopted with at least two kinds of structure of through aperture, convex point, concave point and recess, and each light output unit 9 has a plurality of same light output members 90. As shown in FIG. 14, in this embodiment, the first row of light output units 9 each has a plurality of light output members 90 which are all of concave point, and a plurality of light output members 90' of the second and the third rows of light output units 9 are all through apertures. Of course, the same row of light output units 9 can have different light output members. For example, the light output members 90 of some light output units 9 are of concave point structure, and the light output members 90' of the other light output units 9 in the same row are of through aperture structure. Of course, for the convenience of the technology, generally speaking, the same row of light output units 9 are preferred to be the same. The complex structure of this embodiment can be selected according to the requirements, which can optimize various structures to provide even and bright light to the key module.

Figure 17:
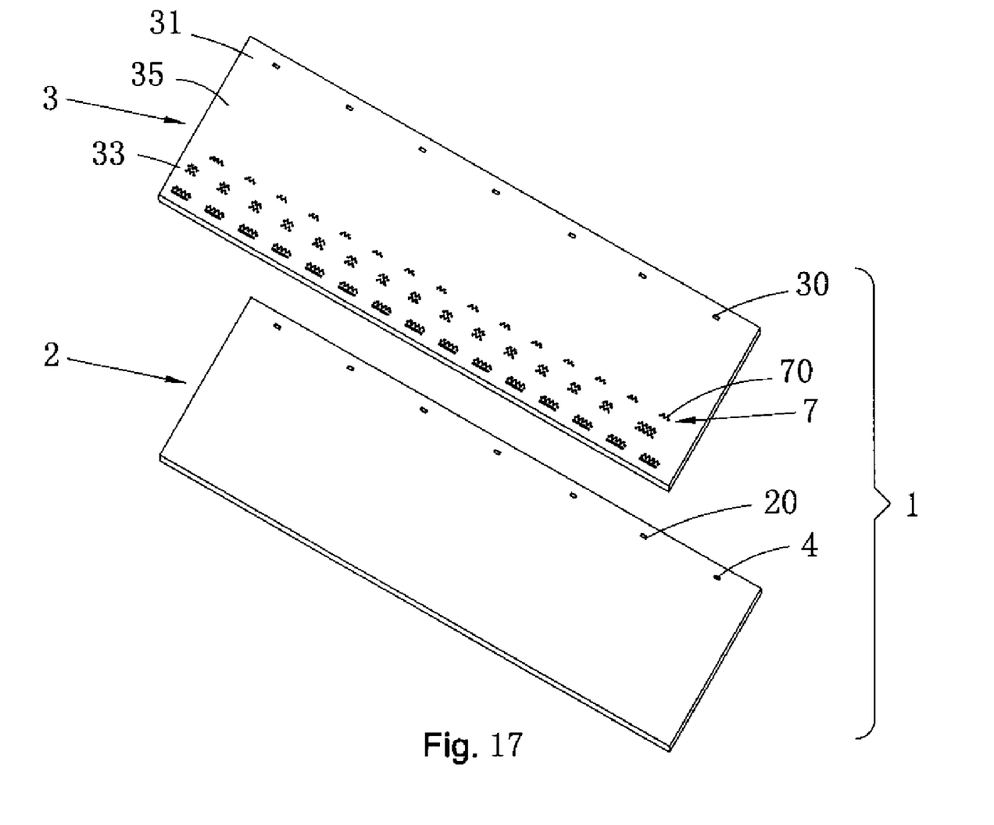
FIG. 17 is similar to FIG. 2 but showing a luminous module in accordance with another alternative embodiment of the present invention.

In addition, in the above mentioned embodiments, the light guide plate has two light output areas 33 one of which is far away from the illuminants 4 and the other is close to the illuminants 4. The illuminants 4 are adopted with LEDs each emitting light with unilateral side. The light emitting side of each LED faces the light output area 33 far away from the illuminants 4 and so opposes to the other light output area 33 close to the illuminants 4. Since the other light output area is close to the illuminants 4 and so can better receive the light reflected from the light reflection plate 2, the light output units 7 of the other light output area can also provide bright light to the key module 10. Referring to FIG. 17, in an alternative embodiment of the present invention, the illuminants 4 can be located close to an edge of the light reflection plate 2, and so one light output area 33 is defined at the light guide plate 3, which can be processed according to the requirements.

The illuminated keyboard of the present invention has the following advantages. Firstly, the illuminated keyboard with a light guide plate of the present invention has the illuminants located at the light reflection plate to emit light to the light input units of the light guide plate. Then the light is transmitted through the light guide plate, and reflected or scattered at the light output units thereby having the effects of concentrating the light and evenly scattering the light. At the same time, the light emitted to the light reflection plate is reflected to the light output units by the light reflection plate thereby enhancing the intensity of the light emitted to the light output units.

Secondly, the quantity and position of the light output members of each light output unit corresponding to different keys can be adjusted according to the requirements. Different light output units can have different configuration. The light output members can also be configured to be different structure according to the requirements. Therefore, the configuration of the light output members can be optimized whereby the luminous module can provide even and bright light to the key module.

Thirdly, the light source of the illuminated keyboard with a light guide plate of the present invention is provided by the way of providing the illuminants locally and then evenly emitting the light to each key via the light output units, instead of the way of providing illuminants under each key, thereby effectively saving energy.

In summary, the illuminated keyboard of the present invention has the function of providing even and bright light to the key module through the light guide plate with light output units, thereby providing ornaments or identifying the position of the keys. Furthermore, the illuminated keyboard of the present invention has a simple structure, can effectively save energy and reduce the production cost.

Although the present invention has been described in detail with above said embodiments, but it is not to limit the scope of the invention. So, all the modifications and changes according to the characteristic and spirit of the present invention, are involved in the protected scope of the invention.

What is claimed is:

1. An illuminated keyboard with a light guide plate comprising:
    a key module; and
    a luminous module located under the key module, the luminous module comprising:
    a transparent light guide plate, comprising a plurality of light input units and light output units, the light input units being sections formed at the light guide plate, each light output unit being provided with a plurality of light output members to provide light to the key module;
    a plurality of illuminants, located corresponding to the light input units, the light emitted by the illuminants being transmitted into the light guide plate via the sections, the light output units located at the same side of the illuminants each having increasing quantity of light output members with the increasing distance between the light output units and the illuminants; and
    a light reflection plate located under the light guide plate;
    wherein the illuminants are LEDs emitting light with unilateral side and located at the light reflection plate; the light reflection plate is provided with a plurality of receiving holes respectively receiving the illuminants therein, a circuit board is disposed at the bottom surface of the light reflection plate corresponding to the receiving holes, the circuit board is electrically connected with the illuminants and is connected to a power supply via a power wire; a plurality of through holes is defined in the light guide plate thereby forming the sidewall of the through hole to be the light input units; and the through holes located corresponding to the receiving holes respectively receive the illuminants therein;
    wherein each light output member is a round through aperture, and the outermost light output units far away from the illuminants are further provided with elongate through slots respectively;
    wherein the light output units are arranged in a plurality of rows, and the light output units at the same side of the illuminants are interlaced with each other.

2. The illuminated keyboard with a light guide plate of claim 1, wherein the key module is provided with a plurality of rows of keys; the light guide plate is provided with a light input area, a light output area, and a connection area connected between the light input area and the light output area; the light input units are located at the light input area, the light output units are located at the light output area; and the connection area is located corresponding to at least one row of keys.

3. An illuminated keyboard with a light guide plate comprising:
    a key module having a plurality of rows of keys; and
    a luminous module located under the key module, the luminous module comprising:
    a transparent light guide plate having a light input area, a light output area, and a connection area connected between the light input area and the light output area, the light input area being provided with a plurality of light input units which are sections formed at the light guide plate, the light output area being provided with a plurality of light output units to provide the light to the key module, the connection area being located corresponding to at least one row of keys;
    a plurality of illuminants located corresponding to the light input units, the light emitted by the illuminants being transmitted into the light guide plate via the sections; and
    a light reflection plate located under the light guide plate;
    wherein the illuminants are LEDs emitting light with unilateral side and located at the light reflection plate; the light reflection plate is provided with a plurality of receiving holes respectively receiving the illuminants therein, a circuit board is disposed at the bottom surface of the light reflection plate corresponding to the receiving holes, the circuit board is electrically connected with the illuminants and is connected to a power supply via a power wire; a plurality of through holes is defined in the light guide plate thereby forming the sidewall of the through hole to be the light input units; and the through holes located corresponding to the receiving holes respectively receive the illuminants therein;
    wherein the light output units are arranged in a plurality of rows, and the light output units at the same side of the illuminants are interlaced with each other.

4. An illuminated keyboard with a light guide plate comprising:
    a key module; and
    a luminous module located under the key module, the luminous module comprising:
    a transparent light guide plate having a plurality of light input units which are sections formed at the light guide plate, and a plurality of light output units to provide the light to the key module, each light output unit having a plurality of light output members which have at least two kinds of structure selected from through aperture, convex point, concave point, and recess;
    a plurality of illuminants located corresponding to the light input units, the light emitted by the illuminants being transmitted into the light guide plate via the sections; and
    a light reflection plate located under the light guide plate;
    wherein the light output members are disposed at opposite sides of the light guide plate whereby the light output members disposed at the side opposite the light reflection plate directly transmit light to the key module.

5. The illuminated keyboard with a light guide plate of claim 4, wherein the illuminants are LEDs emitting light with unilateral side and located at the light reflection plate; the light reflection plate is provided with a plurality of receiving holes respectively receiving the illuminants therein, a circuit board is disposed at the bottom surface of the light reflection plate corresponding to the receiving holes, the circuit board is electrically connected with the illuminants and is connected to a power supply via a power wire; a plurality of through holes is defined in the light guide plate thereby forming the sidewall of the through hole to be the light input units; and the through holes located corresponding to the receiving holes respectively receive the illuminants therein.

6. The illuminated keyboard with a light guide plate of claim 4, wherein the light output units are arranged in a plurality of rows, and the light output units at the same side of the illuminants are interlaced with each other.

* * * * *